H. A. KIMBALL.
TOOL FOR SHAPING AND DRESSING STONE.
No. 191,241.　　　　　　　　　　　Patented May 29, 1877.
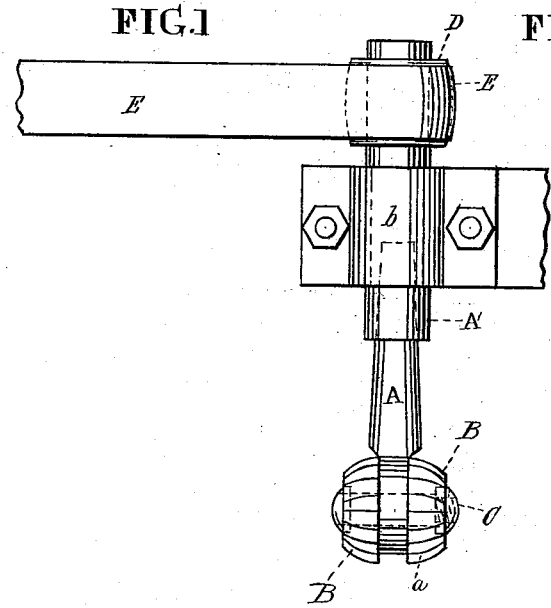
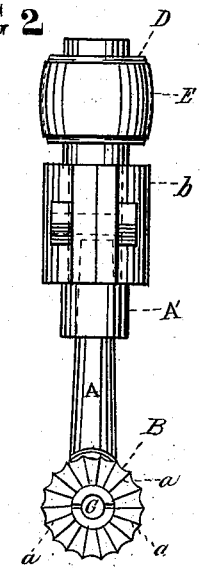
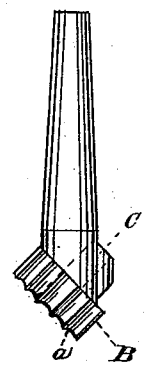

UNITED STATES PATENT OFFICE.

HIRAM A. KIMBALL, OF PHILADELPHIA, PA., ASSIGNOR OF ONE-THIRD HIS RIGHT TO ALICE E. MILLER, OF MOORESTOWN, N. J.

IMPROVEMENT IN TOOLS FOR SHAPING AND DRESSING STONE.

Specification forming part of Letters Patent No. 191,241, dated May 29, 1877; application filed January 27, 1877.

*To all whom it may concern:*

Be it known that I, HIRAM A. KIMBALL, of the city and county of Philadelphia, in the State of Pennsylvania, have invented a new and useful Tool for Shaping and Dressing different kinds of Stone, &c., which improvement is fully set forth in the following specification, reference being had to the accompanying drawings, in which—

Figures 1 and 2 are side views at right angles to each other, illustrating my invention for cutting grooves. Fig. 3 illustrates a modification for forming V grooves or angular edges.

Like letters of reference in all the figures indicate the same parts.

My invention consists of a revolving shaft or spindle, which is provided with one or more cutting-disks pivoted thereto. The pivots are out of line with the shaft, so that the revolutions of the latter cause a rolling motion of the disks. The latter have a multiplicity of cutters or teeth, which, when the shaft is revolved rapidly by any suitable mechanism, bite or press into the stone in rapid succession, whereby a rapid cutting away of the stone is effected, and a smooth surface produced. The disks are so arranged in relation to the axis of the shaft that a continuous action of their teeth on the stone is maintained, so as to prevent any jar or thumping, and also to secure their full service.

I make the cutter-disks of any variety of shape to correspond with the shape of the groove, molding, or surfaces to be produced, and arrange their pivots out of line with the axis of the shaft or spindle.

A is the shaft or spindle, which is revolved by any suitable mechanism. In Figs. 1 and 2 it is represented as fitting in the lower end of the shaft A', which turns in a suitable bearing, and is provided with a pulley over which a belt passes to the motive power. But the spindle A may be connected with any convenient and suitable device for revolving it. B B are cutter-disks, which have a multiplicity of cutting-teeth, *a*, so as to bite the stone in rapid succession, to speedily produce the desired form with a smooth surface. The disks are on the pivots C C, which project from opposite sides of the spindle A. They are formed on the ends of a rod, the middle portion of which is permanently secured in the flattened end of the spindle, as shown in the drawings.

The disks are curved toward the centers of the outer sides, as represented, to give an easy cut when the tool is used for sinking the surface or forming a groove, but when the surface has merely to be leveled after a level, or nearly level, surface has been produced, the cutting-edges may be square, and any desired form may be given to the teeth *a*.

For cutting V-grooves the forming-edge of the disk or disks is of the same angle as the grooves have to be. In Fig. 3 the two angles are at right angles to each other for cutting grooves of the same angle. And for making any other desired form the disks or toothed wheels are of corresponding form.

I claim as my invention—

One or more cutting-disks or toothed wheels pivoted to a spindle or shaft, with the pivots in a different line or lines of axis to that of the spindle, in such a manner that the revolutions of the spindle or shaft shall revolve the disks, and cause their cutting-edges to bite the stone in rapid succession, as the disks perpetually roll thereon during the revolutions of the spindle, substantially as and for the purpose set forth.

HIRAM A. KIMBALL.

Witnesses:
 THOMAS J. BEWLEY,
 STEPHEN USTICK.